United States Patent [19]

Beim et al.

[11] Patent Number: 5,599,251
[45] Date of Patent: Feb. 4, 1997

[54] SIX SPEED AUTOMATIC TRANSMISSION FOR AUTOMOTIVE VEHICLES

[75] Inventors: Rudolf Beim, Bloomfield Hills; Daniel W. McCarrick, Canton, both of Mich.

[73] Assignee: Ford Motor Company, Dearborn, Mich.

[21] Appl. No.: 535,305

[22] Filed: Sep. 27, 1995

[51] Int. Cl.$^6$ .......................... F16H 3/66; F16H 47/08
[52] U.S. Cl. .................. 475/275; 475/279; 475/276; 475/280
[58] Field of Search ................... 475/275, 276, 475/277, 278, 279, 280, 288

[56] References Cited

U.S. PATENT DOCUMENTS

| | | | |
|---|---|---|---|
| 2,886,809 | 6/1959 | Kiss | 475/275 |
| 3,094,013 | 6/1963 | Ferguson | 475/281 |
| 3,265,175 | 8/1966 | Crosswhite | 475/282 |
| 3,482,469 | 12/1969 | Mori | 475/286 |
| 3,659,479 | 5/1972 | Kiss | 475/276 |
| 4,404,869 | 9/1983 | Numazawa et al. | 475/276 |
| 4,416,168 | 11/1983 | Arai et al. | 475/271 |
| 4,572,026 | 2/1986 | Weiss | 475/269 |
| 4,624,154 | 11/1986 | Kraft et al. | 475/277 |
| 4,938,096 | 7/1990 | Takahashi et al. | 475/271 |
| 4,944,719 | 7/1990 | Takahashi et al. | 475/311 |
| 4,994,006 | 2/1991 | Kinoshita et al. | 475/311 |
| 5,039,305 | 8/1991 | Pierce | 475/281 |
| 5,106,352 | 4/1992 | Lepelletier | 475/282 |
| 5,129,870 | 7/1992 | Pierce | 475/278 |
| 5,194,056 | 3/1993 | Schiffhauer | 475/282 |
| 5,267,913 | 12/1993 | Beim et al. | 475/281 |
| 5,267,916 | 12/1993 | Beim et al. | 475/281 |
| 5,435,792 | 7/1995 | Justice et al. | 475/279 X |
| 5,460,579 | 10/1995 | Kappel et al. | 475/280 X |

FOREIGN PATENT DOCUMENTS

| | | | |
|---|---|---|---|
| 579526 | 1/1994 | European Pat. Off. | 475/275 |
| 2483553 | 12/1981 | France | 475/280 |

*Primary Examiner*—Khoi Q. Ta
*Attorney, Agent, or Firm*—Frank G. McKenzie

[57] ABSTRACT

An automatic transmission for an automotive vehicle includes multiple planetary gear units, each including a sun gear, a ring gear surrounding the sun gear, a set of planet pinions continually engaged with the sun gear and ring gear, and a planet carrier rotatably supporting the planet pinions. Various brakes selectively hold elements of the gear units against rotation and several clutches releasably interconnect elements of the, gear units. A torque converter is adapted to produce a hydrokinetic drive connection between the crankshaft of an engine and the input shaft of the transmission, or to mechanically connect those components when a bypass clutch of the torque converter is engaged. Various elements of the planetary gear units are permanently driveably connected mutually.

4 Claims, 1 Drawing Sheet

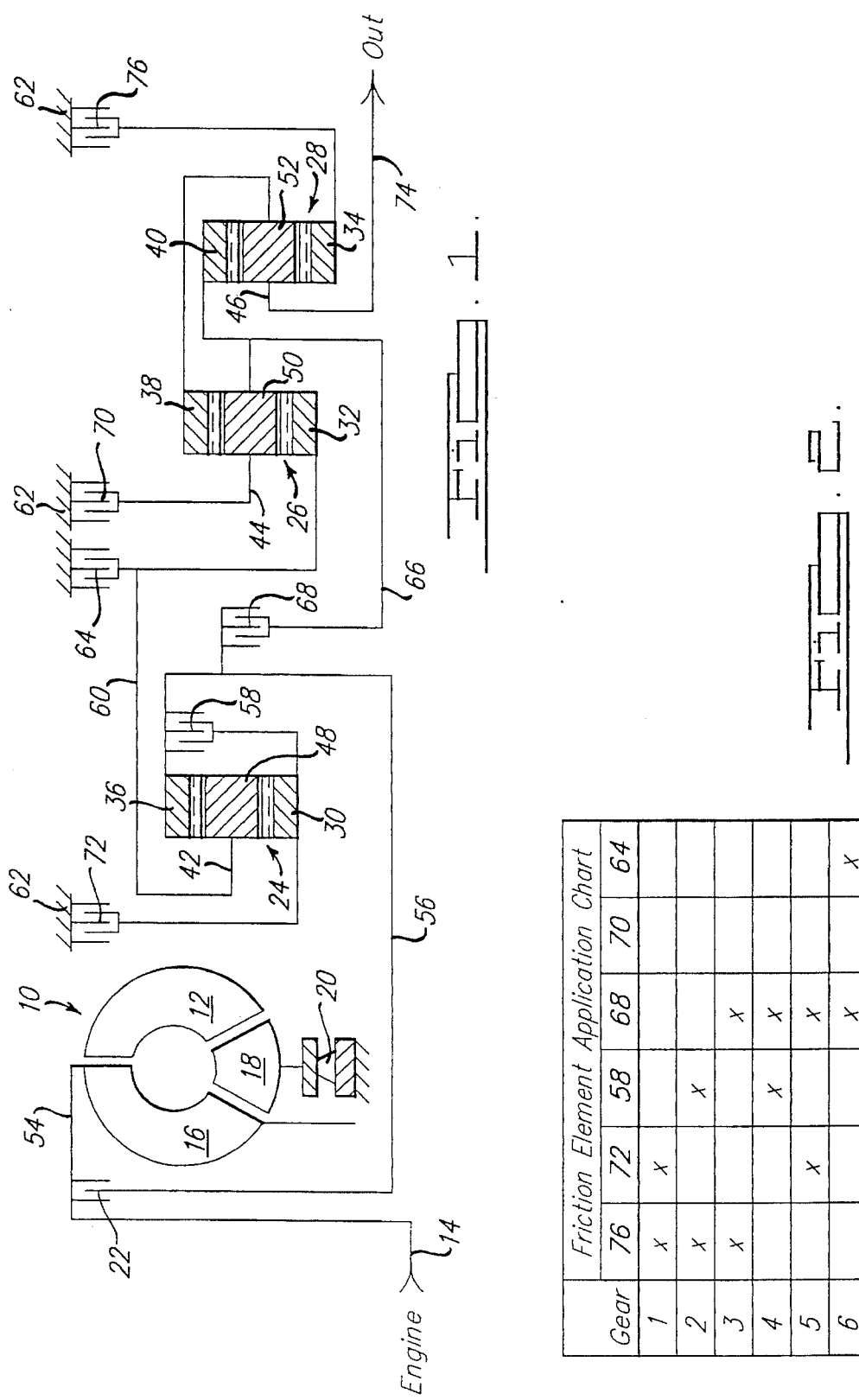

SIX SPEED AUTOMATIC TRANSMISSION FOR AUTOMOTIVE VEHICLES

BACKGROUND OF THE INVENTION

1. Technical Field

The present invention relates to the clutch, brake, and gear arrangement of an automatic transmission for motor vehicles, particularly to such arrangements that combine planetary gear units and layshaft gearsets.

2. Description of Related Art

Four-speed automatic transmissions conventionally include multiple planetary gearsets; five or six friction elements, such as hydraulically actuated clutches and brakes; a torque converter; and damped torque converter lock-up clutch. These transmissions are employed in rear-wheel drive vehicles wherein the transmission shaft engine crankshag are parallel to the longitudinal axis of the vehicle, and front-wheel drive vehicles wherein the transaxle and engine crankshaft are parallel to the transverse axis of the vehicle.

A current trend in the automotive industry is to provide five-speed and six-speed automatic transmissions, which conventionally require three planetary gear units and even a larger number of friction elements to control the gearing than are required in flint-speed transmissions. Automatic transmissions having five or six forward speed ratios require greater size, particularly increased length, to accommodate additional planetary gear unit, and friction elements. Furthermore, automatic transmission require nonsynchronous gearshifting, which conventionally requires still greater use of one-way couplings and more space within the transmission casing, particularly increased length.

These trends toward features that enhance performance of automatic transmissions have produced need for an extremely compact transmission suitable fir use in a front-wheel drive vehicle and able to fit in a space that is greatly reduced in comparison to the spa required for conventional five-speed or six-speed automatic transmissions. Front-wheel drive vehicles present, particularly acute problems because of the inherent space limitations associated with packaging the transmission and engine with their axes directed transversely between the drive wheels of the vehicle.

U.S. Pat. No. 5,106,352 describes a multiple-speed automatic transmission having two gearsets comprising constant mesh gear wheels, a double planetary gearset, and first and second control brakes. The transmission is able to provide six forward speeds, brake neutral, and reverse drive.

SUMMARY OF THE INVENTION

It, is an object of this invention to provide a multiple-speed automatic transmission in a highly compact Form requiring a minimal number of friction elements to control operation of the components of the gear units and gearsets that produce the various speed ratios. The transmission is suitable for use in nonsynchronous and synchronous modes of operation. In realizing this objective the transmission according to this invention includes an input shaft; an output shaft; first, second and third gear units, each having a sun gear, ring gear, planet pinions meshing with the sun gear and ring gear, and carrier rotatably supporting the planet pinions; the ring gear of the first gear unit driveably connected to the input shaft; the carrier of the first gear unit and sun gear of the second gear unit mutually driveably connected; the ring gear of the second gear unit, carrier of the third gear unit, and output shaft mutually driveably connected; the carrier of the second gear unit and ring gear of the third gear unit mutually driveahly connected; a first, brake for releasably holding the sun gear of the third gear unit against rotation; a second brake for releasably holding the sun gear of the first gear unit against rotation; a first clutch for releasably driveably connecting the input shaft and sun gear of the first gear unit; and a second clutch for releasably driveably connecting the input shaft and the carrier of the second gear unit and ring gear of the third gear unit.

The transmission further includes a third brake for releasably holding the carrier of the second gear unit and ring gear of the third gear unit against rotation.

BRIEF DESCRIPTION OF THE DRAWINGS

FIG. 1 is a schematic diagram of a kinematic arrangement according to the present invention.

FIG. 2 is a chart illustrating the condition of the friction elements of the kinematic arrangement of FIG. 1 corresponding to each of the speed ratios.

DESCRIPTION OF THE PREFERRED EMBODIMENT

Referring first to FIG. 1, a torque converter 10 includes an impeller 12 connected driveably to an engine crankshaft 14 of an automotive vehicle driveline. Turbine 16 is arranged in toroidal fluid-flow relationship with respect to the impeller. A bladed stator 18 is located between the flow exit section of the turbine 16 and the flow entrance section of the impeller. The stator 18 is anchored against rotation in one direction by over-running brake 20 during torque multiplication, but rotation in the opposite direction is permitted during coupling operation. A lock-up clutch 22 is used to connect mechanically the turbine and impeller during engagement of the clutch, or to permit the turbine to be driven hydrodynamically from the impeller when the clutch is released.

The gear system includes first, second, and third planetary gear units 24, 26, 28, each having a sun gear 32, 34, 36, a ring gear 36, 38, 40, a carrier 42, 44, 46, and a set of planet pinions 48, 50, 52, rotatably supported on the corresponding carrier and continuously engaged with the corresponding ring gear and sun gear.

Engine crankshaft 14 is driveably connected through an impeller casing 54 to the impeller rotor 12. The transmission input shaft 56 driveably connects turbine wheel 16 and an element of clutch 22 directly to ring gear 36 and indirectly through clutch 58 to sun gear 30 of the first planetary gear unit.

Components of the various gear units are mutually interconnected either permanently or releasably by friction clutches, preferably hydraulically-actuated clutches. Carrier 42 is connected by member 60 permanently to sun gear 32 and releasably to the transmission casing or another nonrotating component 62 through operation of brake 64. Ring gear 40 and carrier 44 are mutually permanently connected and are releasably connected by member 66 through clutch 68 to input shaft 56, and are releasably connected to the transmission casing 62 through brake 70. Sun gear 30 is releasably connected to the transmission casing through operation of brake 72. Ring gear 38, carrier 46, and output shaft 74 are continually mutually connected. Sun gear 34 of the third gear unit 28 is releasably held against rotation on the transmission casing through operation of brake 76.

U.S. Pat. No. 4,509,389, assigned to the assignee of the present invention, illustrates and describes an output shaft 52 driveably connected to the sun gear of a final drive planetary gear unit, whose ring gear is permanently fixed to the transmission casing against rotation. The planet pinion carrier 60 is driveably connected to bevel pinions of a differential mechanism 14 that includes side bevel gears in continuous meshing engagement with the bevel pinions, and right-hand and left-hand axleshafts 34, 35 driveably connected to the side bevel gears and transmitting power to the drive wheels of the motor vehicle. The entire disclosure of the '389 patent, is hereby incorporated by reference.

In operation, the first speed ratio results by engaging brakes 72 and 76, and disengaging the other brakes and clutches. This action holds the ring gear 30 of the first planetary gear unit fixed against rotation while input shaft; 56 drives ring gear 36, so that carrier 42 and sun gear 32 of the second planetary gear unit are underdriven in relation to the speed of input shaft 56. Ring gear 40 and carrier 44 rotate at the same speed. Sun gear 34 is held fixed against rotation on the transmission casing due to engagement of brake 76. Ring gear 38, carrier 46, and output shaft 74 rotate at the same speed, which can be readily determined due to the interconnections among the elements of the second and third planetary gear units 26, 28.

An upshift to the second speed ratio will occur when brake 72 is disengaged and clutch 58 is engaged while maintaining brake 76 engaged. Ring gear 36 and sun gear 30 are driveably connected to input shaft 56; therefore, carrier 42 and sun gear 32 rotate at the speed of the input shaft. Sun gear 34 is fixed against rotation on the transmission casing 62 due to the engagement of brake 76 and the output is taken at ring gear 38, carrier 46, and output shaft 74.

An upshift from the second to the third speed ratio occurs by maintaining brake 76 engaged, disengaging clutch 58, and engaging clutch 68. This action driveably connects ring gear 40 to the input shaft 56 and holds sun gear 34 fixed against rotation so that the output is taken at carrier 46 and output shaft 74.

An upshift from the third to the fourth speed ratio occurs by maintaining clutch 68 engaged, disengaging brake 76, and engaging clutch 58. clutch 68 driveably connects carrier 44 and ring gear 40 to input shaft 56, and clutch 58 driveably connects ring gear 36 and sun gear 30 to the input shaft. Consequently, ring gear 32 is driven at the speed of the input shaft and the output is taken at ring gear 38, carrier 46, and output shaft 74.

An upshift from the fourth to the fifth speed ratio occurs by maintaining clutch 68 engaged, disengaging clutch 58, and engaging brake 72. This action causes carrier 42 of the first gear unit and sun gem, 32 of the second gear unit to be underdriven at the same speed in relation to the speed of shaft 50 because sun gear 30 is fixed against rotation and ring gear 36 is driveably connected to input shaft 56. Clutch 68 driveably connects input shaft 56 and carrier 44. Therefore, the output is taken at ring gear 38, carrier 46, and output shaft 74.

An upshift from the fifth to the sixth speed ratio results by maintaining clutch 68 engaged, disengaging brake 72, and engaging brake 64 instead. When this occurs, sun gear 32 of the second planetary gear unit 26 is fixed against rotation on the transmission casing 62 by engagement of brake 64, carrier 44 is driveably connected through clutch 68 to the driveshaft 56, and the output is taken at ring gear 38, carrier 46, and output shaft 74.

In order to produce reverse drive, brakes 70 and 72 are engaged and the other clutches and brakes are disengaged.

Carrier 42 and sun gear 32 are underdriven in relation to the speed of input shaft 56 because sun gear 30 of the first gear unit is fixed against rotation and ring gear 36 is driveably connected to input shaft 56. Carrier 44 is fixed against rotation due to engagement of clutch 70; therefore, the output is taken at ring gear 38, carrier 46, and output shaft 74.

A second, higher reverse drive ratio is produced when clutch 58 and brake 70 are concurrently engaged and the other friction elements are disengaged. Ring gear 36 and sun gear 30 are then driveably connected to input shaft 56; therefore, carrier 42 and sun gear 32 rotate at the speed of the input shaft. Carrier 44 is fixed against rotation due to engagement of brake 70, and the output is taken at ring gear 38, carrier 40, and output shaft 74.

Although the form of the invention shown and described here constitutes the preferred embodiment of the invention, it is not intended to illustrate all possible forms of the invention. Words used here are words of description rather than of limitation. Various changes in the firm of the invention may be made without departing from the spirit and scope of the invention as disclosed.

What is claimed is:

1. A multiple speed transmission for an automotive vehicle, comprising:

an input shaft;

an output shaft;

first, second and third gear units, each having a sun gear, ring gear, planet pinions meshing with the sun gear and ring gear, and carrier rotatably supporting the planet pinions;

the ring gear of the first gear unit driveably connected to the input shaft; the carrier of the first gear unit and sun gear of the second gear unit mutually driveably connected; the ring gear of the second gear unit, carrier of the third gear unit, and output shaft mutually driveably connected; the carrier of the second gear unit and ring gear of the third gear unit mutually driveably connected;

a first brake for releasably holding the sun gear of the third gear unit against rotation;

a second brake for releasably holding the sun gear of the first gear unit against rotation;

a first clutch for releasably driveably connecting the input shaft and sun gear of the first gear unit;

a second clutch for releasably driveably connecting the input shaft and the carrier of the second gear unit and ring gear of the third gear unit.

2. The transmission of claim 1, further comprising:

a third brake for releasably holding the carrier of the second gear unit and ring gear of the third gear unit against rotation.

3. A multiple speed transmission for an automotive vehicle, comprising:

an input shaft;

an output shaft;

first second and third gear units, each having a sun gear, ring gear, planet pinions meshing with the sun gear and ring gear, and carrier rotatably supporting the planet pinions;

the ring gear of the first gear unit driveably connected to the input shaft; the carrier of the first gear unit, and sun gear of the second gear unit mutually driveably connected; the ring gear of the second gear unit, carrier of the third gear unit, and output shaft mutually driveably connected; the carrier of the second gear unit and ring gear of the third gear unit mntually driveably connected;

a first brake for releasably holding the sun gear of the third gear unit against rotation;

a second brake for releasably holding the sun gear of the first gear unit against rotation;

a fourth brake for releasably holding the carrier of the first gear unit and sun gear of the second gear unit against rotation.

a first clutch for releasably driveably connecting the input shaft and sun gear of the first gear unit; and a second clutch for releasably driveably connecting the input shaft and the carrier of the second gear unit and ring gear of the third gear unit.

4. The transmission of claim 3, further comprising:

a third brake for releasably holding the carrier of the second gear unit and ring gear of the third gear unit against rotation.

* * * * *